United States Patent
Tauscher

[11] 3,723,033
[45] Mar. 27, 1973

[54] ROTARY POWER DEVICE
[75] Inventor: Henry Tauscher, Oak Park, Ill.
[73] Assignee: Impact, Inc., Chicago, Ill.
[22] Filed: July 14, 1971
[21] Appl. No.: 162,421

[52] U.S. Cl. ..............................418/173, 123/8.09
[51] Int. Cl. ........................F03c 3/00, F04c 17/00
[58] Field of Search......418/160, 161, 173, 175, 185, 418/164, 177, 61, 266; 123/8.31, 8.09

[56] References Cited

UNITED STATES PATENTS

| | | | |
|---|---|---|---|
| 3,529,909 | 9/1970 | Klover | 418/173 |
| 3,256,831 | 6/1966 | Eickmann | 418/173 |
| 3,318,291 | 5/1967 | Hallenbeck | 418/61 |

FOREIGN PATENTS OR APPLICATIONS

| | | | |
|---|---|---|---|
| 327,119 | 3/1930 | England | 418/173 |
| 716,565 | 10/1931 | France | 418/173 |

*Primary Examiner*—Clarence R. Gordon
*Attorney*—James B. Kinzer et al.

[57] ABSTRACT

A rotary power device, usable as an engine or as a pump, comprising a rotary piston member concentrically mounted on a shaft within a cylindrical rotary runner member that is eccentrically mounted on the shaft, thus forming a closed, ring-like chamber of varying depth between the piston member and the runner member. The shaft, the piston member and the runner member are keyed together for conjoint rotation. Sliding vanes or other gate members are mounted in the piston member and project outwardly into engagement with the runner member, dividing the chamber into a plurality of chamber segments that vary continuously in volume, between maximum and minimum values, as the piston member and the runner member rotate.

10 Claims, 14 Drawing Figures

INVENTOR
HENRY TAUSCHER

BY
Kinzer, Dorn and Zickert
ATTORNEYS

INVENTOR
HENRY TAUSCHER

ROTARY POWER DEVICE

BACKGROUND OF THE INVENTION

The rotary internal combustion engine has long been recognized as a potentially efficient and light-weight source of power. Many different rotary engine constructions have been proposed in the past, but engines of this kind have rarely reached substantial commercial acceptance. The proposed designs for engines of this kind have ranged from simple devices with a quite limited number of moving parts to highly complex devices with literally hundreds of rotating parts.

Most rotary engines have included a cylindrical stator encompassing a rotary piston member, with the intake, compression, expansion and exhaust chambers for the engine disposed around the periphery of the rotor. A critical problem in designs of this kind, regardless of the means employed to define the limits of the various engine chambers, arises from the necessity for sealing off the chambers from each other. Where effective sealing is accomplished, excessive wear on the sealing elements of the rotor or on the internal surface of the stator have usually resulted. Indeed, it has been said that the sealing difficulty is the single most important problem that has prevented widespread adoption of rotary engines.

Rotary devices similar in construction to the engines discussed above have proven more acceptable, on a commercial basis, for pump applications, particularly in the pumping of relatively incompressible fluids. For example, rotary roller pumps are in common use for the pumping of water, agricultural chemicals, and industrial liquids. Even in these applications, however, the tendency toward excessive wear of the sealing elements of the pumps has presented a continuing and difficult technical problem, often requiring relatively frequent replacement of the rollers, vanes, or other seal elements.

Another problem frequently presented in connection with rotary internal combustion engines results from the fact that the combustion chamber is often located at a fixed point on the stator. The result is localized heating of the stator, with consequent thermal distortion and continuing thermal stress. This may result in erratic performance of the engine and ultimate failure. Lubrication problems are also rather difficult, in at least some rotary engine designs, with tentative solutions entailing the introduction of oil into the combustion mixture or elaborate lubrication systems intended to maintain the rotating parts of the engine in operation.

There have been a few proposals for rotary internal combustion engines that have not incorporated a stator, a least in the usual sense of the term. One example of a rotary internal combustion engine that utilizes two rotating elements instead of the usual rotor and stator is Nixon, U.S. Pat. No. 1,777,932, incorporating a cylindrical outer rotor member having two axially displaced internal compartments, and a two-element inner rotor eccentrically mounted within the two compartments of the external rotor. In the Nixon engine, however, the sealing problem prevalent in more conventional designs for rotary engines is still present, since there is a relatively large range of movement between the internal and external rotor elements. Furthermore, localized heating of the engine parts is inevitably present, due to the combustion firing arrangement employed in the engine. Another proposed engine that did not use a conventional stator, but employed plural rotating members, was an early version of the engine commonly referred to as the Wankel engine, as described in Popular Science, March 1960, pages 82–86, and particularly page 85. Again, however, the same sealing problem that has plagued rotary engines is presented, due to a large range of relative rotational movement between the inner and outer rotors of the engine. Moreover, localized heating was also likely in this engine. The Wankel engine was subsequently modified to incorporate a stationary external member instead of an external rotor.

SUMMARY OF THE INVENTION

It is an object of the present invention, therefore, to provide a new and improved rotary internal combustion engine that is compact, light in weight, and capable of high power output, and that effectively minimizes or eliminates the problems and difficulties of previously known rotary engines.

A specific object of the invention is to provide a new and improved construction for a rotary power device, suitable for use as either an engine or a pump, that effectively minimizes friction between the principal elements of the device by limiting relative movement therebetween to an exceedingly small range.

Another object of the invention is to provide a new and improved high power rotary engine that includes no stator and that permits the use of multiple firing points to equalize heating effects around the periphery of the engine.

A specific object of the invention is to provide a new and improved rotary power device, suitable for use as a pump or as an engine, that has minimal lubrication needs and is capable of sustained operation over long periods of time and at heavy loads.

Another object of the invention is to provide a new and improved rotary internal combustion engine that can be operated in any desired orientation, that is, with the shaft extending at any angle from the horizontal to vertical.

A rotary power device constructed in accordance with the invention comprises a frame, affording at least one bearing support aligned with a primary axis, and a runner member mounted on the frame for rotation about the primary axis; the runner member has a central opening of generally cylindrical configuration and includes end walls closing off both ends of the central opening. A shaft is mounted on the frame for rotation about the primary axis. A piston member is mounted within the central opening in the runner member, the end surfaces of the piston member being disposed in close sealing relation to the inner end surfaces of the runner member. The peripheral surface of the piston member and the internal surface of the runner member are symmetrical with respect to axes that are parallel to but displaced from each other, and one of those surfaces is symmetrical with respect to the primary axis, so that the peripheral surface of the piston member and the internal surface of the runner member define a closed ring-like chamber varying in radial depth from a minimum of virtually zero along a given radius from the primary axis to a maximum depth at the opposite radius from that axis. Fluid inlet and outlet openings are provided, communicating with the aforesaid chamber. A plurality of gate members are mounted in the piston member for limited radial movement; the gate members project radially outwardly of the piston member, through the chamber and into engagement with the inner surface of the runner member. Each gate member extends for the full length of the central opening in the runner member so that the gate members divide the aforementioned chamber into a corresponding plurality of chamber segments. The shaft, the runner member, and the piston member are all interconnected, by key means, for conjoint rotation about the primary axis, so that the effective volume of each chamber segment varies continuously between a minimum and a maximum as the device rotates.

DESCRIPTION OF THE PREFERRED EMBODIMENTS

FIGS. 1–6 illustrate a rotary power device, constructed in accordance with one embodiment of the present invention, constituting a rotary internal combustion engine 20. Engine 20 comprises a frame generally designated by reference numeral 21 and including a base plate 22 upon which two bearing pedestals 23 and 24 are mounted by suitable means such as the bolts 25. Pedestal 23, the rear pedestal of the engine, is preferably formed as a metal casting. The front pedestal 24 is also preferably a metal casting.

The rear pedestal 23 includes a horizontally oriented opening 26 within which a bearing support member 27 is mounted. Bearing support member 27 includes a bearing cavity 28 within which a rear main bearing, a roller bearing 29, is mounted; the inner wall of cavity 28 affords the outer race for bearing 29. Roller bearing 29 comprises an inner race and cage member 31 and a multiplicity of roller elements 32. Roller bearing 29 is concentrically aligned with a primary axis 33. The inner race member 31 of bearing 29 is affixed to an engine shaft 34 that extends longitudinally of engine 20, shaft 34 being concentric with respect to axis 33.

The front pedestal 24 of engine 20 has a horizontally oriented opening 36 within which a front bearing support member 37 is mounted. Bearing support member 37 includes a horizontally oriented bearing cavity 38 affording the outer race for a second main roller bearing 39. Bearing 39 also comprises an inner race and cage member 41 and a multiplicity of individual roller elements 42. The outwardly facing end of pedestal 24 is covered by a face plate 43, through which shaft 34 projects to permit coupling a load to the engine.

Figures 2, 2A:
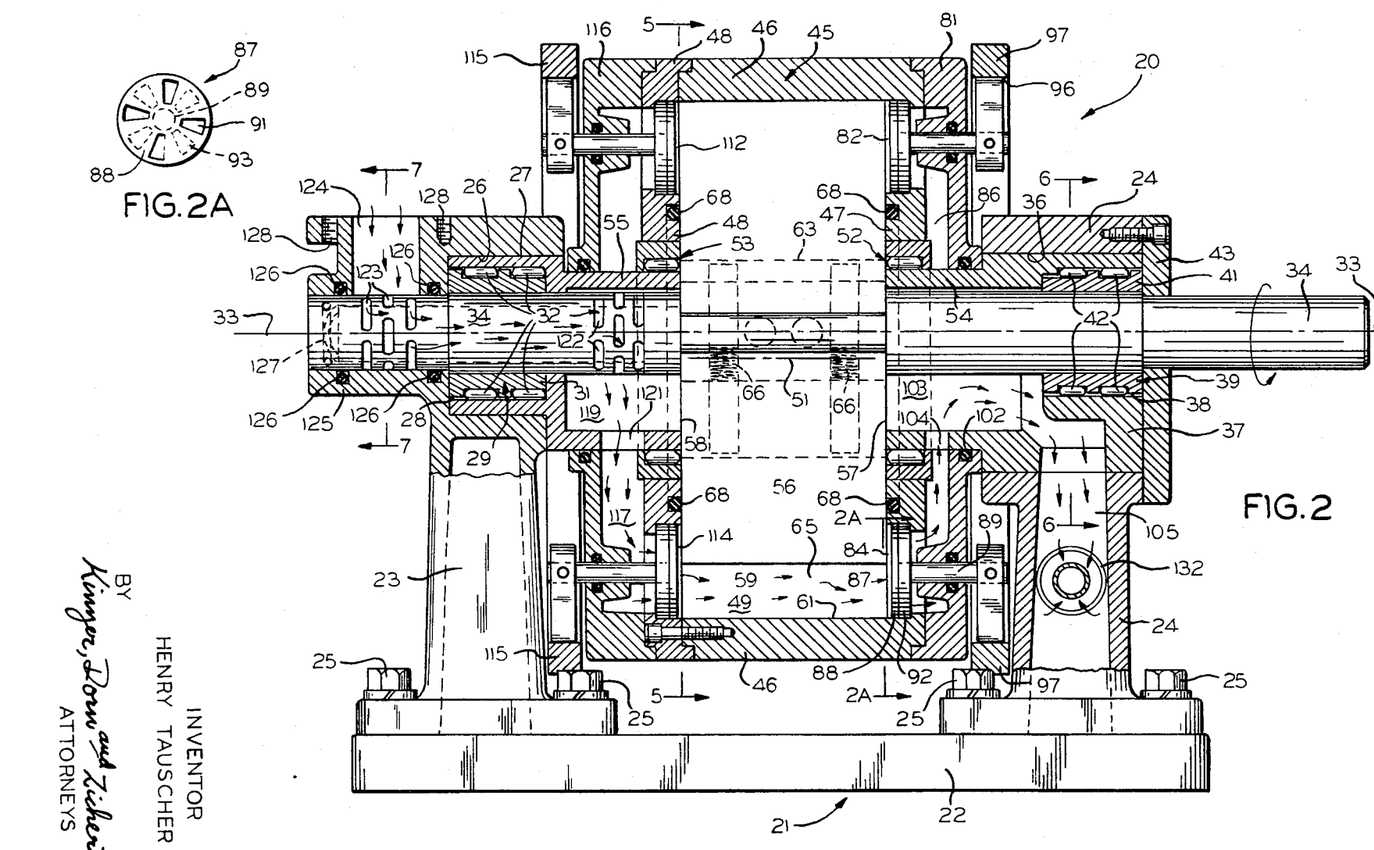
FIG. 2 is a longitudinal sectional elevation view of the rotary engine of FIG. 1.
FIG. 2A is a detail view of a valve structure used in the engine, taken approximately along line 2A—2A in FIG. 2.
Figure 5:
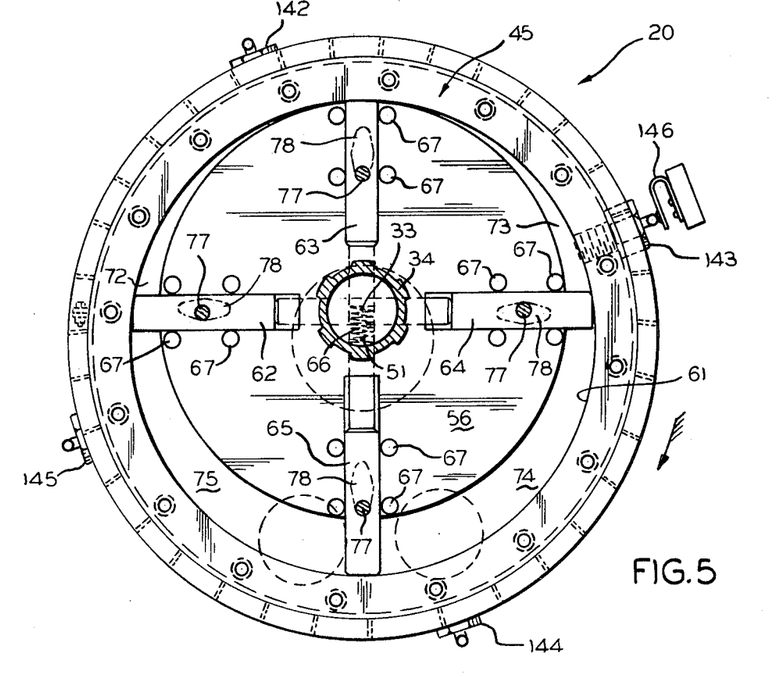
FIG. 5 is a sectional view taken approximately along line 5—5 in FIG. 2.

A runner member 45 is incorporated in engine 20 and is mounted upon the frame pedestals 23 and 24 for rotation about the primary axis 33 of the engine. Runner member 45 comprises a generally cup-shaped element 46 having a front end wall 47. An end wall member 48 is mounted on the rear of the cup-shaped runner element 46 to afford a runner member having a central opening 49 of generally cylindrical configuration. The central opening 49 in the runner member, however, is not symmetrical with the primary axis 33 of engine 20. Rather, the central opening 49 is symmetrical with a secondary axis 51 which is parallel to but displaced from the primary axis of the engine, as best shown in FIGS. 2 and 5. That is, the central opening 49 in runner member 45 is eccentrically located with respect to the axis of rotation of the runner member, the primary axis 33.

The mounting for runner member 45 comprises a pair of roller bearings 52 and 53 mounted in the runner end walls 47 and 48, respectively. The inner race for roller bearing 52 is afforded by a hub 54 that is an integral part of the bearing support member 37 (FIG. 2). Similarly, the inner race for roller bearing 53 comprises a hub 55 that is an integral part of the bearing support member 27.

As most clearly shown in FIG. 2, shaft 34 extends completely through the central opening 49 in runner member 45. A piston member 56 is mounted on shaft 34, within the confines of the central runner opening 49. The front and rear end surfaces 57 and 58 of piston member 56 are disposed in close sealing relation to the inner end surfaces of the runner walls 47 and 48, respectively. The peripheral surface 59 of piston member 56, which in this instance is of circular configuration, is symmetrical with respect to the primary axis 33 of the engine (FIG. 5). Consequently, the peripheral surface 59 of piston member 56 and the inner surface 61 of runner member 45 define a closed ring-like chamber, around the periphery of the central opening 49, that varies in radial depth from a minimum of virtually zero along an upwardly extending vertical radius from primary axis 33 to a maximum along the opposite radius from the primary axis, as shown in FIG. 5.

Engine 20 further comprises four gate members 62, 63, 64 and 65 each mounted within a radial slot in piston member 56, as most clearly shown in FIG. 5. Gate member 65, which projects vertically downwardly from axis 33 when the engine parts are oriented as shown in FIG. 5, extends for the full length of the central opening 49 in runner member 45 (FIG. 2). Similarly, each of the other gate members 62, 63 and 64 3xtends for the full length of the piston and hence from one end wall to the other end wall of the runner member. Moreover, the gate members are all biased outwardly from axis 33, by internal springs 66, so that each gate member engages the inner surface 61 of runner member 45. Suitable sealing elements 67 may be provided along the sides of gate members 62–65 (FIG. 5); edge seals 68 for the ends of the gate members and for the end surfaces 57 and 58 of piston 56 may also be employed. Consequently, the gate members may divide the ring-like chamber around piston member 56 into four separate chamber segments 72, 73, 74 and 75 (FIG. 5).

For effective operation of engine 20, it is necessary to provide some key means to interconnect shaft 34, runner member 45, and piston member 56 for conjoint rotation about the primary axis 33 of the engine. Piston member 56 may conveniently be press fit, keyed, spline fit, or otherwise fixedly mounted directly on shaft 34. Runner member 45 may also be connected directly to shaft 34. In engine 20, however, the keying connection for runner member 45 is effected between piston 56 and runner member 45. A series of pins 77 are mounted on the ends of the gate members 62–65 of piston member 56. Each pin 77 extends into an elongated radial slot in the adjacent side wall of runner member 45, as shown by the phantom slot outlines 78 in FIG. 5. The radial slots 78 are provided for pins 77 because the radial displacement of the pins, relative to runner member 45, changes constantly during rotational movement of the engine. Slots 78, in addition to being elongated, should be widened at their central portions to compensate for very limited angular displacement of runner 45 and piston 56 (usually of the order of 6° to 12°) during operation of the engine.

Figure 3:
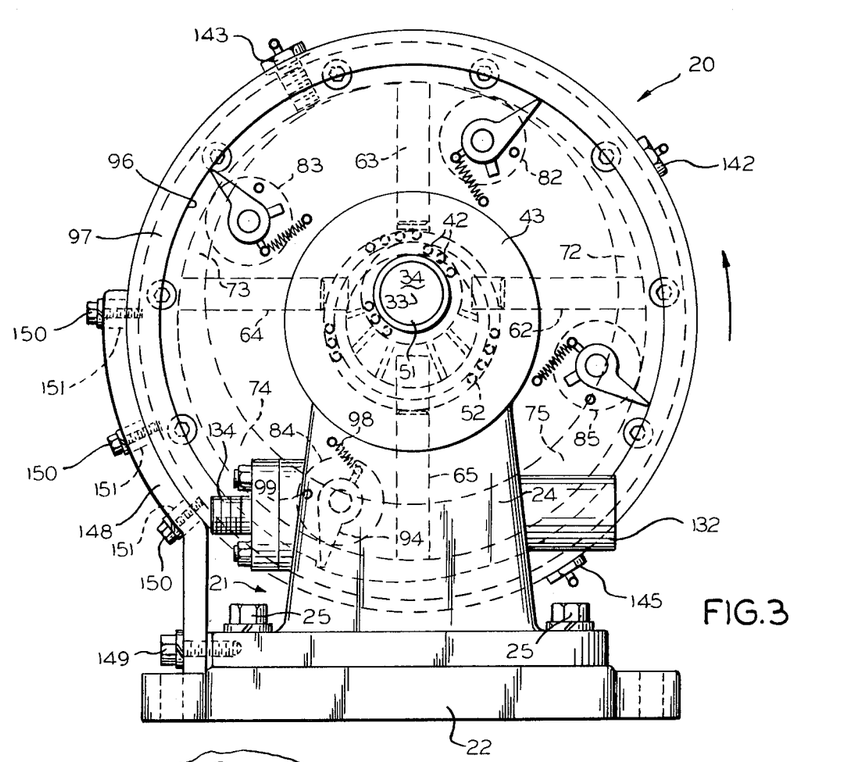
FIG. 3 is an end elevation view of the engine of FIG. 1.

A front cover plate 81 of flattened cup-like configuration is mounted upon runner 45, covering the outer surface of the runner end wall 57 and defining an exhaust chamber 86 between the medial portion of plate 81 and the medial portion of end wall 47 of runner member 45. The runner end wall 47 is provided with four exhaust valve openings 82, 83, 84 and 85 aligned with the working chamber segments 72, 73, 74 and 75 respectively; the location of openings 82–85 is indicated in FIG. 3, and two of the openings 82 and 84 appear in FIG. 2. Each of the openings 82–84 provides a housing for an exhaust valve that communicates with the exhaust chamber 86.

Figure 4:
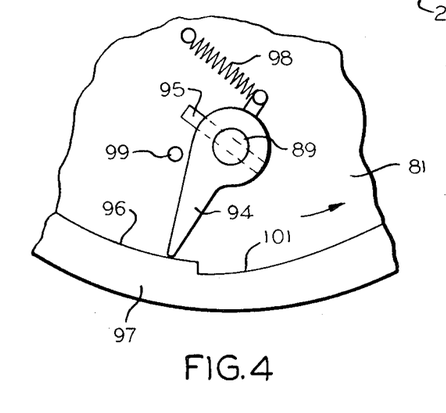
FIG. 4 is a detail view of a valve actuator mechanism employed in the engine of FIGS. 1-3.

One construction that can be utilized for the exhaust valves is shown in FIGS. 2, 2A and 4. As shown in FIGS. 2 and 2A, the exhaust valve 87 that is mounted in opening 84 includes a fixed front valve plate 88 mounted in the inner part of opening 84. Valve plate 88 has four radially extending openings 91 of relatively narrow configuration. Behind valve plate 88 there is a second valve plate 92 which is mounted upon a valve shaft 89. The second valve plate 92 has four radial openings 93. With the valve plates oriented in the position shown in FIG. 2A, the valve 87 is closed. By turning shaft 89 and plate 92 through a relatively small angle, less than 45°, the openings in the two valve plates 88 and 92 can be aligned with each other, thereby opening valve 87.

FIG. 4 illustrates the operating mechanism for valve 87. As shown therein, the valve shaft 89 carries a cam follower 94 which is affixed to shaft 89 by a pin 95 that extends outwardly of the cam follower at one side of the shaft. Cam follower 94 engages a cam track 96 on a ring cam member 97. A spring 98 is connected to cam follower 94 and to cover plate 81, biasing the cam follower into engagement with track 96 and urging the cam follower and shaft 89 toward rotation in a counterclockwise direction as seen in FIGS. 3 and 4. A stop pin 99 mounted on cover plate 81 is positioned for engagement by pin 95, and limits the clockwise rotation of cam follower 94 and valve shaft 89. As seen in FIG. 4, when the cam follower 94 reaches an enlarged diameter portion 101 on cam track 96, spring 98 pivots cam follower 94 and shaft 89 in a counterclockwise direction, the movement being limited by engagement of stop pins 95 and 99. This rotational movement of shaft 89 effects a corresponding rotation of valve plate 92 (FIG. 2A), aligning the valve openings 91 and 93 to open exhaust valve 87. Similar valve structures are provided in each of the four exhaust valve openings 82–85 (FIG. 3).

Figure 6:
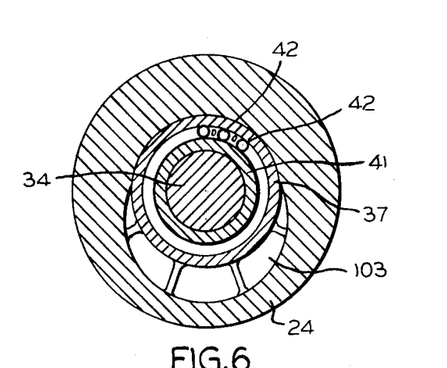
FIG. 6 is a detail sectional view taken approximately along line 6—6 in FIG. 2.

The inner central portion of the exhaust cover plate 81 is disposed in encompassing relation to hub 54 of bearing support member 37 and is sealed to the hub by suitable means such as an O-ring 102. Hub 54 is provided with an enlarged central opening or flue 103 (FIGS. 2 and 6). A passageway 104 connects exhaust chamber 86 into flue 103. Thus, whenever one of the exhaust valves is open, a connecting passageway is completed, through chamber 86, passage 104 and flue 103, into an exhaust chamber 105 in front pedestal 24.

The construction at the rear end of engine 20 is similar to but specifically different from that at the front end of the engine. The rear end wall 48 of runner member 45 is provided with four intake valve openings, similar to the exhaust valve openings 82–85 in wall 47; two of these intake valve openings 112 and 114 are shown in FIG. 2. Each of the valve openings in the rear end wall 48 of runner 45 houses a rotary intake valve corresponding in construction to the exhaust valve 87 described above in connection with FIGS. 2, 2A, 3 and 4. The cam followers of the intake valves engage a cam ring 115 that is similar in construction to the cam ring 97 employed for the exhaust valves. A rear cover plate 116 of flattened cup-like configuration is mounted upon the rear end wall 48 of runner member 45 and defines an intake chamber 117 between the runner end wall 48 and the cover plate 116. The central portion of cover plate 116 is disposed in encompassing relation to the hub 55 of bearing support member 27 and is sealed thereto by appropriate means such as an O-ring 118.

Hub 55 includes an enlarged central opening 119 that communicates with the intake passage 117 through an aperture 121. The rear end of shaft 34 is hollow, and the interior of the shaft communicates with hub opening 119 through a plurality of apertures 122 in the shaft. The outboard end of the hollow shaft is connected, through a series of radial openings 123 in the shaft, with an intake passage 124 in a carburetor mount 125 that is an integral extension of the upper portion of rear pedestal 23. A carburetor may be mounted above passageway 124 by appropriate means comprising the tapped bolt-receiving holes 128. The intake passageway 124 is sealed by means of suitable seals such as the O-rings 126 around the periphery of the outboard rear end of shaft 34. A safety plug 127 closes the outboard end of the hollow portion of shaft 34.

Figure 7:
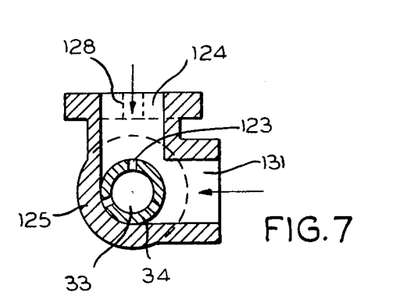
FIG. 7 is a detail sectional view of a modification for the intake of the engine, taken approximately as indicated by line 7—7 in FIG. 2.

Provision may also be made for supercharging of engine 20. Thus, as shown in FIG. 7, the carburetor mount 125 may be provided with an additional intake passageway 131 for connection to a source of high pressure air for supercharging purposes. Passage 131 is disposed at right angles to the main intake passage 124 through which the fuel mixture is introduced into the engine.

Figure 8:
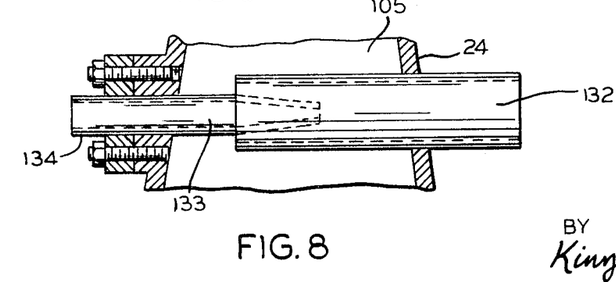
FIG. 8 is a detail sectional view of a part of the engine exhaust.

Provision may also be made for a high efficiency exhaust system for engine 20. As shown in FIGS. 2 and 3, the exhaust chamber 105 in front pedestal 24 is connected to an exhaust conduit 132. Conduit 132 may be connected to the usual muffler and thence to the atmosphere; any appropriate form of exhaust purification system, including a catalytic afterburner, may be employed as desired. As shown in FIG. 8, exhaust conduit 132 extends only partly through the width of chamber 105 in pedestal 24. The open inner end of exhaust conduit 132 encompasses a tapered nozzle 133 connected to a conduit 134 that extends outwardly of the opposite wall of pedestal 24 and is connected to a high pressure air supply. Nozzle 133 and conduit 132 afford a venturi or jet pump to assure rapid and effective scavenging of exhaust gases from chamber 105.

Engine 20 is provided with ignition means comprising four spark plugs 142-145, one for each of the chamber segments 72-75. Each of the spark plugs is mounted in a radial opening runner 45, preferably at the longitudinal center of the runner (see FIG. 1), the spark plug openings each communicating directly with the associated chamber segment. A fixed electrical contact 146, connected to a suitable electrical supply, is mounted in position to engage each of the spark plugs as runner 45 rotates during operation of engine 20 (FIG. 5), completing the ignition system.

Because spark plugs 142-145 are mounted in fixed positions in runner 45, it is desirable to provide some means for adjusting the opening positions for the intake and exhaust valves of the engine in order to adjust the engine timing. As noted above, the actuation of the exhaust valves is controlled by the cam track 96 on the exhaust cam ring 97. Cam ring 97 is supported upon an arcuate support member 148 that is affixed to the lower portion of pedestal 24 by suitable means such as bolts 149. Cam ring 97 is secured to support member 148 by a plurality of bolts 150, each engaged in an elongated slot 151 in support member 148 and each threaded into a tapped opening in ring 97. To adjust the exhaust valve timing, therefore, it is only necessary to loosen the bolts 150, rotate the cam ring 97 to modify the timing as required, and again tighten the bolts. Suitable lock washers may be employed to prevent shifting of the exhaust timing cam 97 during operation of the engine. A similar mounting arrangement (not shown) is employed for the cam ring 115 that controls the actuation and timing of the intake valves. For either of the two cam rings, a balanced support engaging both sides of the ring may be utilized if desired.

In considering the operation of engine 20, it may be assumed that runner 45 and piston 56 start from the position shown in FIG. 5. Rotation of the engine is in a clockwise direction as viewed in FIG. 5. The intake valve for chamber segment 75 has previously been open, admitting an air-fuel mixture into chamber segment 75 through the passages and openings 124, 123, 122, 119, 121 117 and 114 (FIG. 2). The intake valve in opening 114 closes about the time that the runner and piston reach the position shown in FIG. 5.

Continuing rotation of piston 56 and runner 45 drives gate member 65 inwardly of piston member 56; after 90° of rotation, gate member 65 reaches the position occupied in FIG. 5 by gate member 62. This same rotation reduces the volume of chamber segment 75 from that shown in FIG. 5 to the volume shown in the drawing for chamber 72. Thus, the fuel-air mixture in chamber segment 75 is compressed. Continuing rotation of runner 45 and piston 56 brings chamber 75 to the position occupied in FIG. 5 by chamber 73. At this point, the spark plug 145 for chamber 75 engages the electrical contact 146, igniting the mixture of air and fuel in chamber segment 75. As the air-fuel mixture burns, it increases the pressure within the chamber segment and exerts a substantial force against the lead gate 62 for chamber 75, tending to drive the gate member in a direction to continue the clockwise rotation of piston member 56. Since piston 56 and runner 45 are compelled to rotate conjointly by the key connection afforded by pins 77 and slots 78, the same force is applied to runner 45 and both the runner and piston continue their rotational movement with the additional impetus afforded by the burning of the fuel in chamber 75.

The continuing rotation of engine 20 brings chamber 75 to the position shown in FIG. 5 for chamber segment 74. At this time, the exhaust valve for chamber 75 is opened and the hot gases from the chamber are exhausted through the sequence of openings and passageways 86, 104, 103, and 105. The exhaust operation is materially aided by the high pressure venturi arrangement shown in FIG. 8 when this kind of scavenging is utilized.

The operating cycle for chamber segment 75 is repeated for each of the other chamber segments 72, 73 and 74 in continuing sequence. Thus, as each chamber segment is rotated through a complete revolution, the intake valve to the chamber segment is opened and a mixture of air and fuel is drawn into the chamber segment. The air-fuel mixture is compressed and is ignited when the chamber reaches the orientation shown in segment 73 in FIG. 5. The pressure increase caused by the burning of the fuel continues to drive the engine, maintaining rotation of runner member 45, piston member 56, and shaft 34. At the end of the cycle the combustion byproducts are exhausted from the chamber segment through the exhaust valve, which closes prior to the time that the intake valve for the chamber segment opens to draw a new fuel supply into the chamber. In effect, therefore, engine 20 functions much like a four-cylinder two-stroke-cycle internal combustion engine of conventional type.

There are some marked differences in the construction and operation of engine 20, however, as compared with conventional engines of either the linear piston or rotary piston kind. Because both runner 45 and piston 56 rotate continuously at the same speed about the same main axis 33, the angular movement of the piston gages 62–64 relative to the internal surface 61 of runner member 45 is extremely limited. Usually, this angular movement is limited to a range of about 6° to 12°, depending on the engine dimensions, particularly the inner diameter of the runner and the displacement between axes 33 and 51. Consequently, sealing of the chamber segments 72–75 from each other can be effected more efficiently than in previously known rotary engines without introducing the extreme problems of wear and seal maintenance that have long plagued rotary power devices. Friction between the two principal rotating elements of engine 20, piston member 56 and runner member 45, is minimal. The driving connection between these two principal members, afforded by the pins 77 and slots 78, is disassociated from the portions of the gate members that extend into the chamber between the piston member and the runner member and does not add to the sealing problems. The gate members themselves move reciprocally toward and away from the main axis 33 of the engine and can be sealed by relatively simple seals such as the member 67 to prevent communication between the central portion of piston member 56 and the chamber segments around the periphery of the piston member.

The heat distribution for engine 20 is quite even, since the working chamber of the engine is divided into a plurality of segments and combustion takes place in each of those segments. That is, the multiple firing points afforded by the four spark plugs 142–145 effectively equalizes heating effects around the periphery of engine 20. This equalization is made possible by the fact that the engine does not have a stator, in the normal sense of the term, since both of the principal members forming the combustion chambers for the engine rotate around axis 33 at the same speed.

Engine 20 is compact in construction and can be made quite light in weight, particularly if high temperature aluminum alloys and like materials are used in the fabrication of runner 45, piston 56, and gates 62–65. Engine 20 can be operated in virtually any desired orientation. Thus, there is no requirement that shaft 34 by oriented in a horizontal direction as shown in FIG. 2. The shaft can be located at any desired angle, from a horizontal alignment to a completely vertical alignment. The lubrication needs of the engine are minimal, being confined primarily to the main and secondary bearings 29, 39, 52 and 53. Some lubrication may be required for gates 62–65 and can be introduced axially through the hollow end of shaft 34 and through the center of piston 56 as necessary.

Figures 1, 1A, 1B:
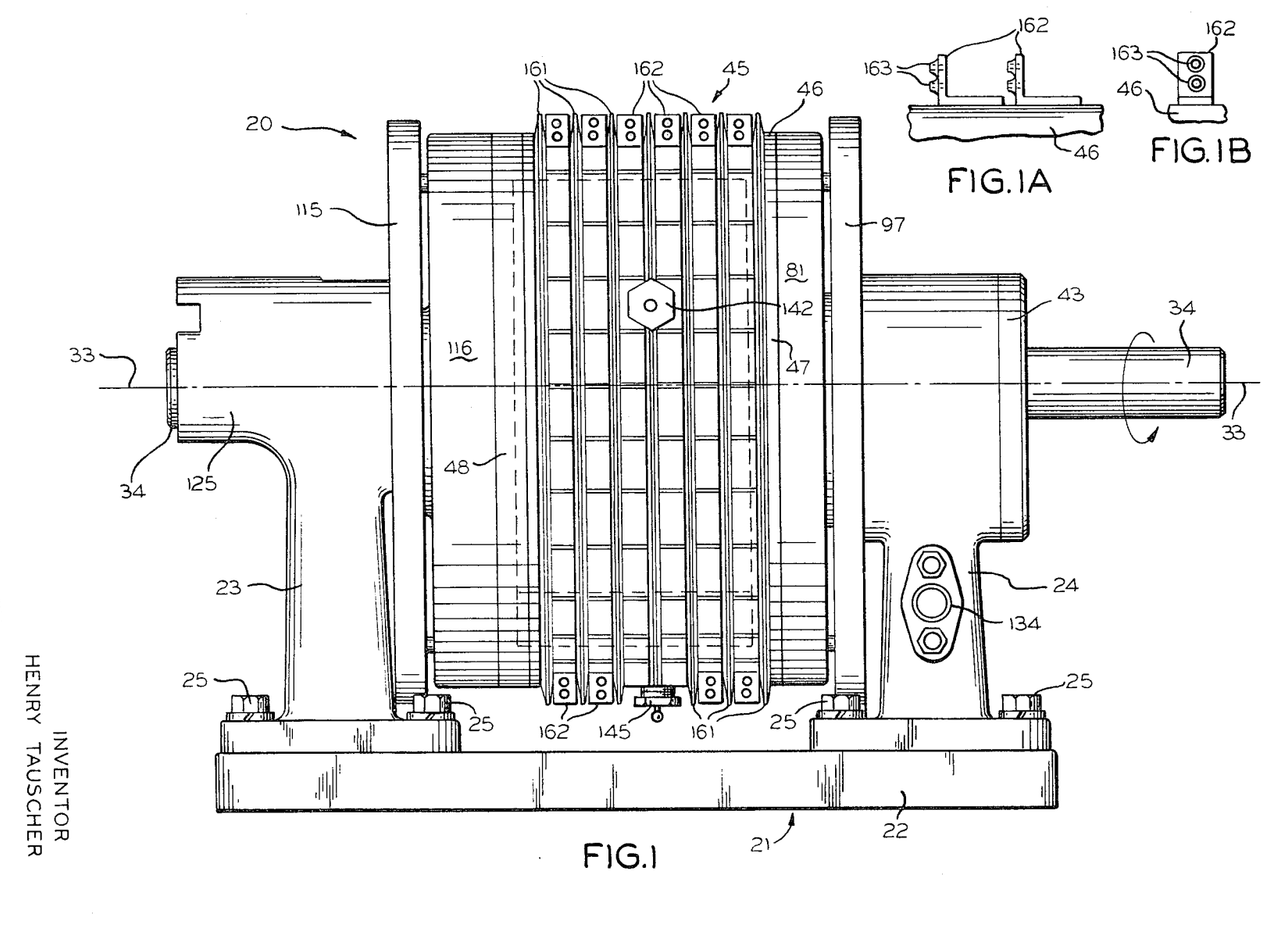
FIG. 1 is a side elevation view of a rotary power device, specifically a rotary engine, constructed in accordance with one embodiment of the present invention.
FIGS. 1A and 1B are detail views of parts of the heat exchanger for the rotary engine of FIG. 1.

Engine 20 may be constructed for liquid cooling if desired. Preferably, however, an air-cooled construction is employed. One suitable cooling arrangement is illustrated in FIG. 1 and comprises a plurality of annular heat exchanging rings 161 mounted upon the main cylindrical element 46 of runner member 45. The mounting should be one which affords a good heat exchange contact between rings 161 and runner member 45.

A multiplicity of individual heat exchange elements 162 are mounted around runner member 45 between rings 161. Each of the heat exchange elements 162 is provided with two or more tapered openings 163 extending through the heat exchange element (FIGS. 1A and 1B). When engine 20 is in operation, with runner member 45 rotating rapidly, air is forced through the openings 163 in the heat exchange elements 162. This provides efficient cooling of the engine without the necessity for elaborate or expensive cooling equipment. No fan is required; runner 45 is its own fan.

Figure 9:
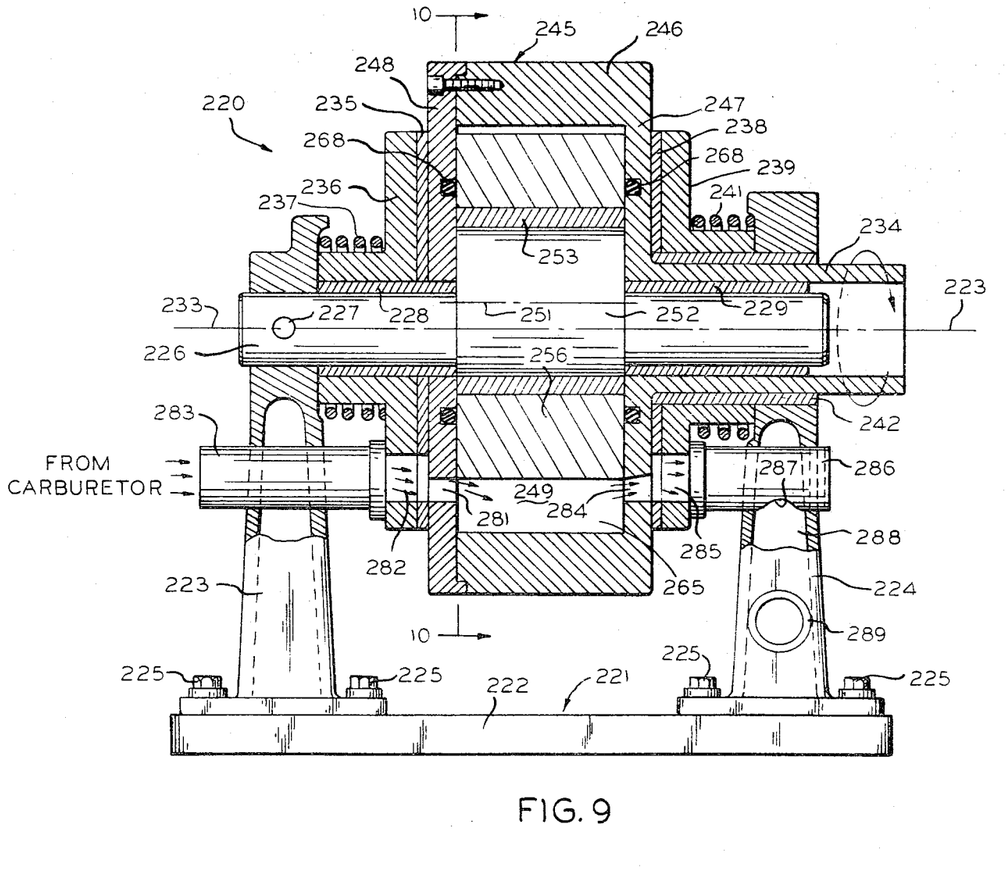
FIG. 9 is a sectional side elevation view, similar to FIG. 2, of another embodiment of the invention.
Figure 10:
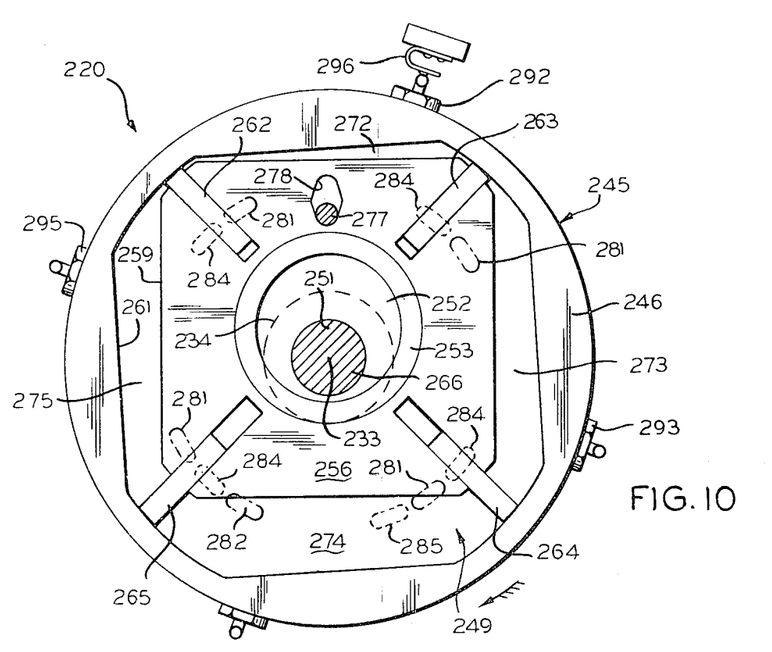
FIG. 10 is a sectional elevation view, taken approximately along line 10—10 in FIG. 9.

FIGS. 9 and 10 illustrate an alternate construction for a four-chamber rotary engine 220 that is somewhat similar to engine 20 as described above but incorporates a number of modifications in the overall engine construction. Engine 220 comprises a frame 221 including a base plate 222 with a rear pedestal 223 and a front pedestal 224 mounted on the base plate by suitable means such as the bolts 225. A fixed shaft 226 is mounted in the rear pedestal 223 of engine 220, a mounting pin 227 extending transversely through the shaft and through pedestal 223. The fixed shaft 226 extends across engine 220 through an enlarged opening in pedestal 224. The axis 233 of shaft 226 constitutes the primary axis of engine 220.

A rear bearing sleeve 228 and a front bearing sleeve 229 are mounted upon the fixed shaft 226, adjacent pedestals 223 and 224 respectively. A runner member 245 is rotatably mounted upon the two bearing sleeves 228 and 229. Runner member 245 comprises a generally cup-shaped element 246 having a front end wall 247. A rear end wall member 248 is mounted on the rim of the cup-shaped element 246. Runner member 245 has a central opening 249 of generally cylindrical configuration that is symmetrical with respect to the primary axis 233 of the engine, as best shown in FIG. 10. The front end wall 247 of runner 245 includes an elongated hollow extension 234 that projects outwardly of the front end of the engine and that constitutes the output shaft of the engine. Shaft 234 is disposed in bearing contact with bearing member 229 and is symmetrical with respect to the primary axis 233 of engine 220.

At the rear or left-hand end of engine 220, as seen in FIG. 9, a thrust bearing plate 235 is mounted around bearing member 228 in engagement with the outer surface of the end wall element 248 of runner member 245. An end bell 236 is mounted adjacent bearing plate 235, the end bell being disposed in encompassing relation to bearing member 228. A spring 237 is interposed between portions of pedestal 223 and end bell 236, biasing the end bell and bearing plate 235 toward the end wall element 228 of runner member 246.

At the front end of engine 220, the construction is similar. A bearing plate 238 engages the outer surface of the end wall 247 of runner member 245 and is maintained in engagement with the runner member by an end bell 239 and a spring 241 interposed between the end bell and the front pedestal 224 of the engine. A bearing sleeve 242 is interposed between shaft 234, on the one hand, and bearing plate 238 and end bell 239 on the other hand. Sleeve 242 extends through the opening in pedestal 224 that encompasses shafts 226 and 234.

A cam 252 is affixed to the central portion of the stationary shaft 226 in alignment with the central opening 249 in runner member 245. Cam 252 and shaft 226 may be of unitary construction, machined from a single metal piece. The peripheral surface of cam 252 is circular in configuration but the cam is not symmetrical with respect to the primary axis 233 of engine 220. Rather, the axis of symmetry for cam 252 is a secondary axis 251. The secondary axis 251 is parallel to the primary axis 233 but is displaced substantially therefrom, as shown in both FIGS. 9 and 10.

A bearing sleeve 253 is mounted upon cam 252. A piston member 256 is rotatably mounted upon sleeve 253 within the central opening 249 in runner 245. Cam 252, bearing sleeve 253, and piston member 256 all have end surfaces that are disposed in close sealing relation to the inner end surfaces of the runner end walls 247 and 248. Auxiliary sealing means, such as the O-ring seal 268, can be provided for piston member 256 and runner member 245 if desired.

As shown in FIG. 10, the inner surface 261 of runner member 245 is generally rectangular in configuration with arcuate corners on the rectangle. Similarly, the peripheral surface 259 of piston member 256 is of generally rectangular configuration with arcuate corners. As noted above, however, piston member 256 is essentially symmetrical with respect to the secondary axis 251, whereas runner member 245 is essentially symmetrical with respect to the primary axis 233. The corners formed by the internal surface 259 of piston member 256 are aligned with but are angularly smaller than the arcuate corners of the internal surface 261 of runner member 245.

From FIG. 10 it can be seen that piston surface 259 and runner surface 261 conjointly define a closed ring-like chamber, around the periphery of the central opening 249 of runner member 245, that varies in radial depth from a minimum of virtually zero along an upwardly extending vertical radius from primary axis 233 to a maximum along a downwardly directed vertical radius from the primary axis. Stated differently, the minimum radial depth of the ring-like chamber between the piston and the runner, in engine 220, occurs along one radius taken on the diameter intersecting both the axes 233 and 251, whereas the maximum radial depth occurs along the opposite radius. The same relation ship obtains in engine 20 (FIG. 5).

Engine 220 further comprises four gate members 262, 263, 264 and 265, each mounted within a radial slot in piston member 256 (FIG. 10). Each of the gate members 262-265 extends for the full length of the central opening 249 in runner member 245, as illustrated by gate members 262 and 265 in FIG. 9. As in the previous embodiment, the gate members may be provided with suitable sealing elements along their sides, although this is not essential in engine 220 because the slots in which the gate members are mounted in piston 256 are closed at their inner ends. Springs may be provided to bias gate members 263-265 outwardly into engagement with the arcuate corners of the internal runner surface 261; on the other hand, for a high speed engine, centrifugal force may be relied upon to maintain the gate members in sealing engagement with the inner surface of chamber 249. As best shown in FIG. 10, gate members 262-265 divide the ring-like chamber around piston member 256 into four separate chamber segments 272, 273, 274 and 275.

As in the previous embodiment, engine 220 includes key means to interconnect shaft 234, runner member 245, and piston member 256 for conjoint rotation about the primary axis 233 of the engine. In engine 220, shaft 234 constitutes an integral part of runner member 245. Both shaft 234 and runner 245 are journalled on the sleeve bearings mounted on the fixed shaft 226, assuring conjoint rotation of shaft 234 and runner member 245 about axis 233. Piston member 256, on the other hand, is keyed to runner member 245. The key means utilized in this instance comprises a pin 277 projecting inwardly from runner member 245 into an elongated slot 278 in piston member 256. The central portion of slot 278 may be widened somewhat to compensate for limited angular displacement between runner member 245 and piston member 256 during operation of the engine. A similar pin and slot connection may be provided on the opposite side of the engine.

The rear wall 248 of runner member 245 is provided with four small intake openings 281, one intake opening for each of the chamber segments 272-275. The positions of the intake openings 281 are shown in phantom outline in FIG. 10, and one intake opening 281 is illustrated in FIG. 9. As shown in FIG. 9, the radial location of the openings 281 is aligned with a passageway 282 that extends through bearing plate 235 and end bell 236. An intake conduit 283 mounted in pedestal 223 connects with passageway 282; conduit 283 is connected to a suitable carburetor or other source of fuel/air mixture (not shown). As shown in FIG. 10, the intake openings are normally masked by piston 256, being exposed to their respective chamber segments only for a limited arcuate open range that coincides, in part, with the position of intake passageway 282 (FIG. 10).

The front end wall 247 of runner member 245 includes four small exhaust openings 284 one for each chamber segment 272-275. The locations of the four exhaust openings 284 are illustrated by dashed outlines in FIG. 10, and one appears in FIG. 9. The radial orientation of the exhaust openings 284 is aligned with an exhaust passageway 285 that extends through bearing plate 238 and through the front end bell 239 into an exhaust conduit 286 mounted in the front pedestal 224 of the engine. Conduit 286 is provided with an opening 287 that communicates with an exhaust chamber 288 in pedestal 224. Chamber 288, in turn, opens into a further exhaust conduit 289 corresponding to conduit 132 in the engine of FIGS. 1-8. Exhaust openings 284 are normally closed off from their respective chamber segments 272-275 by piston member 256, being open only for a limited arcuate range coinciding in part with the location of exhaust passage 285 (FIG. 10).

Engine 220 includes ignition means comprising four spark plugs 292, 293, 294 and 295, one for each of the chamber segments 272-275. Each of the spark plugs is sealed into a radial opening in runner 245. A fixed electrical contact 296, connected to a suitable electrical supply, is positioned to engage each of the spark plugs 292-295 as runner 245 rotates during operation of engine 220. Preferably, the fixed contact 296 should be mounted for angular adjustment relative to runner 245, within a limited range, to afford a means for adjusting the timing of the engine, since there is no provision in engine 220 for changing the timing of exhaust or intake valves.

In considering the operation of engine 20, it may be assumed that runner 245 and piston 256 start from the position shown in FIG. 10. Rotation of the engine is in a clockwise direction as viewed in FIG. 10. As the engine rotates, the intake opening 281 for chamber segment 274 comes into alignment with intake conduit 282 and admits a mixture of fuel and air into chamber segments 274. At the time the fuel-air mixture is admitted into chamber segment 274, the chamber segment is relatively large in volume.

Continuing rotation of runner 245 and piston 256 reduces the volume of chamber segment 274, as illustrated by chamber segment 275, compressing the fuel and air mixture. As chamber 274 reaches its minimum volume, at the position illustrated in FIG. 10 by chamber segment 272, spark plug 294 engages the fixed electrical contact 296 and fires, igniting the fuel/air mixture in chamber segment 274. As the mixture in chamber 274 burns, it increases the pressure in the chamber segment and exerts a substantial force against the lead gate 265 for chamber 274, tending to drive gate member 265 and piston member 256 in a direction to continue clockwise rotation of the engine. The driving force is transmitted to runner 245 by the keying means comprising pin 277 and slot 278.

Continuing rotation of the engine moves chamber segment 274 through the position shown in FIG. 10 for chamber segment 273 and ultimately brings the exhaust opening 284 for chamber segment 274 into alignment with the exhaust conduit 285. The hot gases from chamber 274 are exhausted through the passageway 285, conduit 286, chamber 288, and conduit 289 (FIG. 9). Scavening of the exhaust gases may be aided by a high pressure venturi arrangement of the kind described above in connection with FIG. 8.

The operating cycle for chamber 274 is repeated for each of the other chamber segments 272, 273 and 275 in continuing sequence. As each chamber segment rotates through a complete cycle of 360°, the intake opening 281 to the chamber segment comes into alignment with intake conduit 282 and a mixture of air and fuel is drawn into the chamber segment. The air-fuel mixture is compressed and is ignited when the spark plug for the chamber segment engages contact 296. The periodic pressure increases caused by the burning of the fuel in the chamber segments drive the engine, maintaining continuous rotation of piston member 256, runner member 245 and output shaft 234. At the end of the cycle for each chamber segment, the combustion byproducts are exhausted from the chamber segment when the exhaust opening 284 of that chamber segment comes into alignment with exhaust conduit 285. Thus, as in the case of engine 20, engine 220 functions in accordance with the basic operating cycle of a four-cylinder two-stroke-cycle internal combustion engine.

In engine 220, as in engine 20, the angular movement of gates 262 and 265 relative to the internal surface 261 of runner member 245 is extremely limited. Accordingly, the friction and wear at the points of contact between the piston gates and the runner are quite limited, so that maintenance of a seal at each of the gates is much easier than with rotary engines of conventional construction. Driving connections between the principal members of the engine are disassociated from the gate members and do not add to the sealing problems of the engine. Heat distribution for engine 220 is quite even. The engine is compact in construction and includes a minimum number of working parts. Like engine 20, engine 220 can be operated in any desired orientation, with the engine shaft extending at any alignment desired. Engine 220 may be equipped with an air cooling heat exchanger as described above in connection with engine 20; liquid cooling can be utilized if desired.

Figure 11:
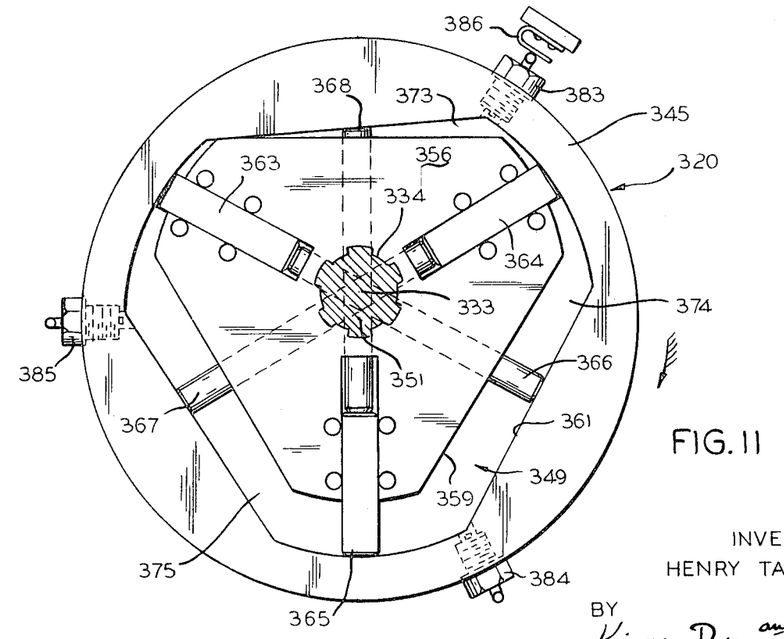
FIG. 11 is a sectional elevation view, generally corresponding to FIG. 5, of yet another embodiment of the invention.

FIG. 11 is a simplified sectional view, generally similar to FIGS. 5 and 10, of a rotary internal combustion engine 320 constructed in accordance with an additional embodiment of the invention. Engine 320 comprises a cylindrical runner 345 having a central opening 349 of generally triangular configuration, but with arcuate corners, opening 349 being substantially symmetrical with respect to a secondary axis 351 for the engine. The primary axis 343 for engine 320 is the axis of a main shaft 334. Shaft 334 is a splined shaft with a piston member 356 mounted on the shaft within the central opening 349 of runner 345. The external surface 359 of piston member 356 is of generally triangular configuration, with arcuate corners, and is symmetrical with respect to the primary axis 333 of the engine.

Engine 320 is equipped with three gate members 363, 364 and 365, each mounted in an elongated slot in piston member 356 that is aligned with one of the arcuate corners of the piston member. The inner edge of gate 363 is engaged by one or more guide pins 366 that extend through guide openings in piston member 256 and in shaft 334. Similar guide pins 367 and 368 are provided with gates 364 and 365 respectively. The diametrical distance for each combination of a gate and its guide pins remains constant during rotation of engine 320, so that the guide pins serve to maintain the gates in constant contact with the inner surface 361 of the central opening 349 in the runner member 345. As in the previous embodiments, runner member 345 is provided with end walls (not shown) and the gate members 363–365 extend for the full axial length of opening 349 and into sealing engagement with the end walls of the runner member. Furthermore, piston 356 extends completely across central opening 349, in an axial direction, and into sealing engagement with the end walls of runner member 345.

Gates 363–365 divide the ring-like chamber between piston surface 359 and runner surface 351 into three chamber segments 373, 374 and 375. There are three spark plugs 383, 384 and 385, one for each of the three chamber segments 373–375. A fixed electrical contact 386 is positioned to energize each of the spark plugs at one point during rotation of runner member 345. Engine 320 is also provided with intake and exhaust means communicating with chamber segments 373–375; the intake and exhaust arrangements may correspond to those described above for either of engines 20 and 220 and have not been illustrated.

The operation of engine 320 is essentially similar to the engines described above except that there are only three chamber segments so that the engine operates in a manner similar to a three piston engine of conventional type. Starting from the position shown in FIG. 11, an air fuel mixture is drawn into chamber segment 375. The mixture is compressed as the engine rotates, rotation being in a clockwise direction as shown in FIG. 11. When chamber 375 reaches the position illustrated for chamber 373, its spark plug 385 engages contact 386 and the spark plug fires, igniting the air/fuel mixture in the chamber segment.

The resultant burning of the fuel in chamber segment 375 exerts a substantial force against the lead gate 363 for the chamber, driving the engine toward continuing rotation in a clockwise direction. As runner 345 and piston 356 continue their rotation, chamber segment 375 is brought to the position shown in FIG. 11 for chamber segment 374. An exhaust port is opened, the burned gases are exhausted from the chamber 375, and the cycle repeats. The operating cycle for each of the other two chamber segments 373 and 374 is the same as described for chamber segment 375. Thus, engine 320 operates like a three-cylinder two-stroke cycle internal combustion engine.

Each of the three internal combustion engines 20, 220 and 320 described above is compact, light in weight, and capable of a high power output. In each of the engines, friction between the principal elements of the engine is quite limited, particularly because the friction between the rotating piston and the rotating runner is greatly reduced because both rotate simultaneously. Each of the engines affords balanced firing around the periphery of the engine, equalizing heating of the runner and the piston. It will be recognized that each of the engines can be converted to a pump by eliminating the spark plugs and by driving the device from an external source. Any one of the engines can be operated in any desired orientation.

The use of pistons and runners of substantially polygonal configuration with arcuate corners, as in engines 220 and 320, allows for shaping of the chamber segments to optimize combustion in the engine. With either polygonal or circular pistons and runners, the total number of chamber segments can be selected to suit the power range and the operating characteristics required of the engine.

I claim:

1. A rotary power device comprising:
   a frame;
   a cylindrical runner member, having end walls closing off both ends of a central opening therein, mounted on said frame for rotation about a primary axis;
   a piston member, mounted in the central opening in said runner member and having end walls disposed in close sealing relation to the end walls of said runner member;
   the peripheral surface of said piston member and the internal surface of said runner member being symmetrical with respect to axes that are parallel to but displaced from each other, so that said surfaces conjointly define a closed ring-like chamber varying in radial depth from a minimum along a first radius taken on a diameter intersecting both said axes to a maximum along a second oppositely directed radius, one of said axes of symmetry coinciding with said primary axis;
   fluid inlet means and fluid outlet means communicating with said chamber, said fluid outlet means comprising a plurality of exhaust openings in one end wall of said runner member, one exhaust opening for each chamber segment;
   a plurality of gate members, mounted in said piston for limited movement redially thereof and extending outwardly of the piston member through said chamber into engagement with the inner surface of said runner member, each gate member extending for the full length of said central opening so that said gate members divide said chamber into a corresponding plurality of chamber segments;
   and key means, interconnecting said runner member and said piston member for conjoint rotation, whereby the effective volume of each chamber segment varies continuously between a minimum and a maximum.

2. A rotary power device, according to claim 1, in which said fuel inlet means comprises a plurality of inlet openings in the other end wall of said runner member, one inlet opening for each chamber segment.

3. A rotary power device, according to claim 2, in which said inlet and exhaust openings for each chamber segment are angularly displaced from each other.

4. A rotary power device, according to claim 3, in which said inlet and exhaust openings for each chamber segment are normally masked by said piston member except for a limited arcuate open range in the rotation of said piston and runner members, the arcuate open ranges for the inlet and exhaust openings of each chamber segment being angularly displaced from each other.

5. A rotary power device, according to claim 2, and further comprising:
   a corresponding plurality of normally closed inlet valves, one mounted in each inlet opening;
   inlet valve actuating means for actuating each inlet valve to open condition during only a limited arcuate inlet range in the rotation of said piston and runner members;
   a corresponding plurality of normally closed exhaust valves, one mounted in each exhaust opening;
   and exhaust valve actuating means for actuating each exhaust valve to open condition during only a limited arcuate exhaust range in the rotation of said piston and runner members, said inlet range and said exhaust range being angularly displaced from each other.

6. A rotary power device, according to claim 5, in which each of said valves includes a cam follower projecting externally of said runner member, and in which said inlet valve actuating means comprises a stationary cam mounted on said frame in position to actuate said cam followers of said inlet valves at a given point in the rotation of said runner member and said exhaust valve actuating means comprises a stationary cam mounted on said frame in position to actuate said cam followers of said exhaust valves at a given point in rotation of said runner member.

7. A rotary power device, according to claim 6, in which each of said cams comprises an annular cam ring, and further comprising means for angularly adjusting the position of each cam ring to control the timing of the opening of said inlet valves and said exhaust valves independently of each other.

8. A rotary power device, according to claim 6, comprising an internal combustion engine, and further comprising:

means for introducing a fuel-air mixture into the individual chamber segments of said device, in sequence, through said fluid inlet means, as each chamber segment passes a first rotational position; and ignition means for igniting the fuel-air mixture in each chamber at a second rotational position for that chamber segment displaced a substantial angular distance from said first rotational position.

9. A rotary internal combustion engine, according to claim 8, in which said ignition means comprises a plurality of spark plugs mounted on said runner, each spark plug extending into a respective one of said chamber segments, and electrical contact means for firing each spark plug each time said runner reaches said second rotational position.

10. A rotary power device according to claim 1 and further comprising a rotary shaft having an axis coincident with the primary axis of said device and with the axis of symmetry of the internal surface of said runner member, said rotary shaft being affixed to said runner member for conjoint rotation therewith, and a stationary shaft extending coaxially through said central opening in said runner member, said stationary shaft having a circular cam affixed thereto concentric with the axis of symmetry of said piston member, said circular cam projecting into the central opening in said runner member, and said piston member being rotatably mounted upon said circular cam member.

* * * * *